United States Patent
Saruwatari et al.

(10) Patent No.: US 8,108,105 B2
(45) Date of Patent: Jan. 31, 2012

(54) ELECTRIC POWER STEERING APPARATUS AND METHOD FOR CONTROLLING SAME

(75) Inventors: Takehiro Saruwatari, Kashiwara (JP); Yasuhiro Kamatani, Nara (JP)

(73) Assignee: JTEKT Corporation, Osaka-shi (JP)

( * ) Notice: Subject to any disclaimer, the term of this patent is extended or adjusted under 35 U.S.C. 154(b) by 827 days.

(21) Appl. No.: 12/171,607

(22) Filed: Jul. 11, 2008

(65) Prior Publication Data

US 2009/0018726 A1    Jan. 15, 2009

(30) Foreign Application Priority Data

Jul. 13, 2007    (JP) ................................. 2007-184347

(51) Int. Cl.
*B62D 6/06* (2006.01)

(52) U.S. Cl. .............. 701/41; 701/42; 701/43; 180/444; 180/446

(58) Field of Classification Search ............ 701/41, 701/42, 43; 180/144, 146, 444, 446
See application file for complete search history.

(56) References Cited

U.S. PATENT DOCUMENTS

| | | | |
|---|---|---|---|
| 7,242,161 B2 * | 7/2007 | Okamoto et al. | 318/432 |
| 7,860,624 B2 * | 12/2010 | Kubota et al. | 701/41 |
| 2002/0056587 A1 * | 5/2002 | Shibasaki et al. | 180/443 |
| 2005/0182541 A1 * | 8/2005 | Tamaizumi et al. | 701/41 |
| 2007/0118262 A1 * | 5/2007 | Nishizaki et al. | 701/41 |
| 2008/0033613 A1 * | 2/2008 | Tamaizumi et al. | 701/41 |
| 2009/0143938 A1 * | 6/2009 | Nishimura | 701/41 |
| 2009/0271075 A1 * | 10/2009 | Hales et al. | 701/43 |
| 2010/0138109 A1 * | 6/2010 | Wang et al. | 701/41 |

FOREIGN PATENT DOCUMENTS

| | | |
|---|---|---|
| EP | 1 767 436 A1 | 3/2007 |
| JP | 2000-43739 | 2/2000 |
| JP | 2006-298300 | 11/2006 |

* cited by examiner

*Primary Examiner* — Paul N Dickson
*Assistant Examiner* — Marlon Arce
(74) *Attorney, Agent, or Firm* — Oblon, Spivak, McClelland, Maier & Neustadt, L.L.P.

(57) ABSTRACT

In a control method for an electric power steering apparatus having a steering member, a steering mechanism, and a motor for assisting steering, a steering torque applied to a steering wheel is detected, frequency analysis is performed on the detected torque, and a determination is made as to whether or not a torque component having a frequency equal to or higher than a predetermined value is included in the result of the frequency analysis. When such a torque component is included in the frequency analysis result, a predetermined rotary torque is generated in a single direction.

7 Claims, 4 Drawing Sheets

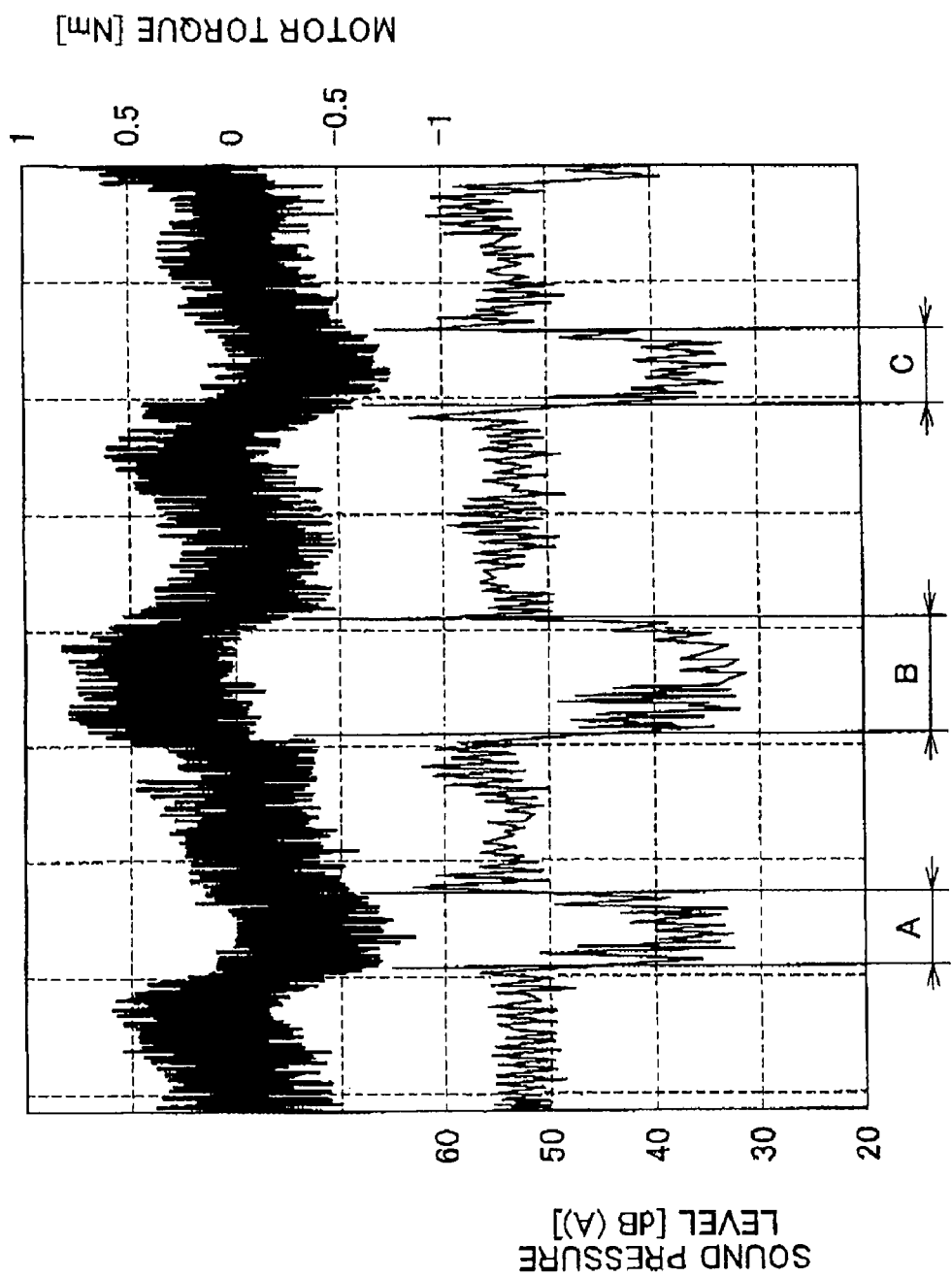

_US 8,108,105 B2_

ELECTRIC POWER STEERING APPARATUS AND METHOD FOR CONTROLLING SAME

INCORPORATION BY REFERENCE

The disclosure of Japanese Patent Application No. 2007-184347 filed on Jul. 13, 2007 including the specification, drawings and abstract is incorporated herein by reference in its entirety.

BACKGROUND OF THE INVENTION

1. Field of the Invention

The invention relates to an electric power steering apparatus that assists steering by applying the rotary force of a motor, which is driven on the basis of a detection result of a steering torque applied to a steering member, to a steering mechanism. The invention also relates to a method of controlling such an electric power steering apparatus.

2. Description of the Related Art

In an electric power steering apparatus that assists steering by driving a steering assist motor in accordance with a rotation operation of a steering member such as a steering wheel and applying power generated by the motor to a steering mechanism, steering torque applied to the steering member is detected by a torque sensor, a target value of a steering assist force is determined on the basis of the detected steering torque, and the motor is subjected to drive control in order to generate the target assist force.

A column assist type electric power steering apparatus in which a steering assist motor is attached to a midway position of a steering column that connects a steering member to a steering mechanism such that rotation of the motor is reduced in speed and transmitted to a steering shaft in the interior of the steering column via a gear reducer such as a worm gear reducer or a spur gear reducer, and then applied to the steering mechanism, exists as one form of this type of electric power steering apparatus (for example, Japanese Patent Application Publication No. 2006-298300 (JP-A-2006-298300) and Japanese Patent Application Publication No. 2000-43739 (JP-A-2000-43739)).

In this type of electric power steering apparatus, when backlash between a motor-side smaller gear and a steering shaft-side larger gear of the gear reducer is excessively large, the teeth of the smaller and larger gears, which move relative to each other within the range of the backlash, collide with each other, creating an unpleasant noise (gear rattle noise). In particular, gear rattle noise generated by the action of reverse input applied from the steering mechanism side when steering is not underway may unnecessarily dismay a driver who hears this noise. Conversely, when backlash between the smaller and larger gears is excessively small, meshing friction increases, leading to a reduction in transmission efficiency, and it is therefore important to ensure that the backlash between the smaller and larger gears is appropriate.

In response to this problem, in the related art, assembly of a gear reducer has been implemented so that backlash between the smaller and larger gears is maintained at an appropriate level but since a high degree of dimensional precision is required in the outer diameter and the tooth profile of the smaller and larger gears, and in addition, a high degree of precision is also required in the distance between the respective centers of the smaller and larger gears, processing and assembly require a large number of man-hours.

The electric power steering apparatus described in JP-A-2006-298300 is provided with a compression spring that urges a worm serving as the smaller gear such that the worm is pressed toward a meshing portion between the worm serving as the smaller gear and a worm wheel serving as the larger gear. Due to the action of this compression spring, the worm is pressed against the worm wheel, and as a result, backlash errors that occur during assembly are absorbed.

The electric power steering apparatus described in JP-A-2000-43739 is constituted such that the position of a support portion on one side of a worm can be adjusted in a contact/separation direction relative to a worm wheel, and therefore backlash errors that occur during assembly can be accommodated through positional adjustment of the support portion.

According to these constitutions, appropriate backlash can be achieved without the need for a high degree of precision in processing and assembly. However, the support structure of the smaller gear is complicated, leading to an increase in the number of components, and since additional processing is required on peripheral parts, the effect of reducing the number of man-hours involved in processing and assembly is small.

SUMMARY OF THE INVENTION

The invention provides an electric power steering apparatus that is capable of effectively suppressing gear rattle noise in a gear reducer for reducing the rotation of a steering assist motor in speed and transmitting the reduced rotation to a steering mechanism, and in particular gear rattle noise produced by the action of reverse input, through control of the steering assist motor and without mechanically adjusting backlash.

An electric power steering apparatus according to a first aspect of the invention includes a torque sensor that is disposed in a midway position of a steering shaft connecting a steering member to a steering mechanism, and that detects a steering torque applied to the steering shaft; a motor that is driven according to the detected torque in order to assist steering by transmitting a rotary force of the motor to the steering mechanism via a gear reducer; an analysis unit that subjects the detected torque to frequency analysis; and a control unit that drives the motor to generate a predetermined rotary torque in a single direction when a torque component having a frequency equal to or higher than a predetermined frequency is included in a result of the frequency analysis.

The first aspect described above centers on the fact that reverse input, which is a cause of gear rattle noise in the gear reducer, has a higher frequency than positive input, which is applied to the steering mechanism in accordance with an operation of the steering member. Hence, the torque detected by the torque sensor is subjected to frequency analysis, and when a torque component having a frequency equal to or higher than a predetermined frequency is included in the analysis result, control is implemented to drive the steering assist motor in a single direction so as to generate a predetermined rotary torque. As a result, the teeth of smaller and larger gears constituting the gear reducer can be maintained in a pressed-together state by the action of the rotary torque, and therefore gear rattle noise can be prevented effectively.

The rotary torque is determined by setting an envisaged rotary torque (approximately 5 N·m) applied to the steering shaft through reverse input as a reference, and dividing a slightly smaller rotary torque (approximately 4 N·m) than the reference torque by the reduction ratio of the gear reducer. In so doing, steering assistance through positive input is not impaired, the state of contact between the teeth produced by the action of the reverse input can be maintained, and gear rattle noise can be prevented reliably.

The electric power steering apparatus according to the aspect described above may also include a positive/reverse determination unit that determines, on the basis of the analysis result, whether the detected torque is a positive input torque applied from the steering member or a reverse input torque applied from the steering mechanism. In this aspect, the control unit may be constituted to drive the motor to generate the predetermined torque in the single direction when it is determined by the positive/reverse determination unit that reverse input is applied.

In the aspect described above, the fact that the frequency of torque applied to the steering shaft due to the action of reverse input is typically 10 Hz or more, which is considerably higher than the frequency of torque applied to the steering shaft due to the action of positive input, is used to determine whether the torque detected by the torque sensor is positive input or reverse input from the frequency analysis result. The control of the steering assist motor described above is only executed when it is determined that reverse input is applied, and therefore gear rattle noise can be prevented reliably without impairing steering assistance through positive input.

The electric power steering apparatus according to the first aspect described above may also include a steering angle sensor that is disposed in a midway position of the steering shaft further toward the steering mechanism side than the torque sensor, and that detects a rotation angle of the steering shaft. In this aspect, the control unit may drive the motor to generate the predetermined rotary torque in an opposite direction to a steering direction determined from a detection result of the steering angle sensor.

In the aspect described above, the direction of the rotary torque generated by the steering assist motor during an operation of the control unit is set in an opposite direction to the direction of the steering angle, and therefore the teeth of the gear reducer can be pressed together more reliably by rotary torque in an opposite direction to the direction of the rotary torque used to assist steering.

A second aspect of the invention is a control method for an electric power steering apparatus having a steering member, a steering mechanism, and a motor for assisting steering. In this aspect, a steering torque applied to a steering shaft that connects the steering member to the steering mechanism is detected, frequency analysis is implemented on the detected torque, and the motor is caused to generate a predetermined rotary torque in a single direction when a torque component having a frequency equal to or higher than a predetermined frequency is included in a result of the frequency analysis.

In the aspect described above, the torque detected by the torque sensor is subjected to frequency analysis, and when a torque component having a frequency equal to or higher than a predetermined frequency is included in the analysis result, control is implemented to drive the steering assist motor in a single direction so as to generate a predetermined rotary torque. Thus, the teeth of smaller and larger gears constituting the gear reducer can be maintained in a pressed-together state by the action of the rotary torque, gear rattle noise can be prevented effectively, and other favorable effects can be achieved.

BRIEF DESCRIPTION OF THE DRAWINGS

The foregoing and further objects, features and advantages of the invention will becomes apparent from the following description of example embodiments with reference to the accompanying drawings, wherein like numerals are used to represent like elements, and wherein:

FIG. 4 is a diagram showing the results of an experiment performed to investigate a gear rattle noise generation state.

DETAILED DESCRIPTION OF THE EXAMPLE EMBODIMENTS

Figure 1:
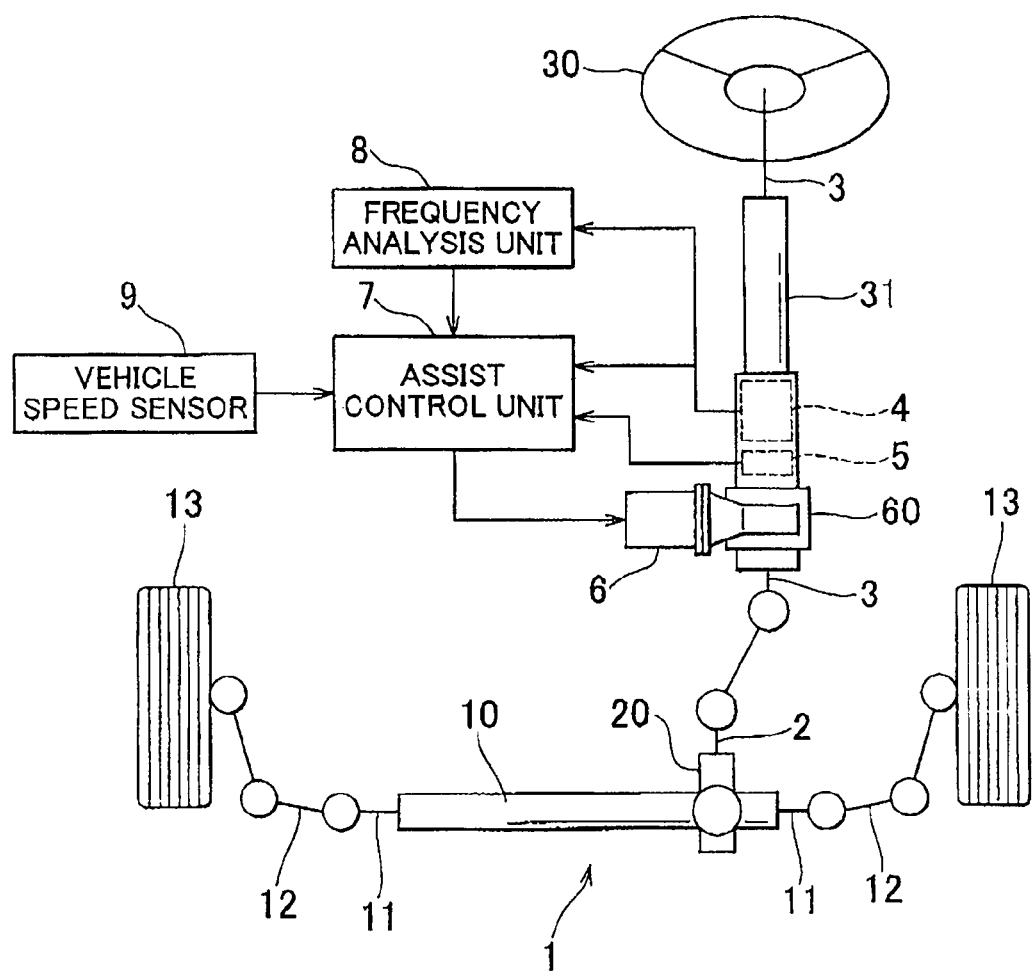
FIG. 1 is a schematic diagram showing the constitution of an electric power steering apparatus according to an embodiment of the invention.

The invention will be described in detail below with reference to drawings illustrating an embodiment thereof. FIG. 1 is a schematic diagram showing the constitution of an electric power steering apparatus according to the embodiment of the invention. Note that FIG. 1 shows an example in which the invention is applied to a vehicle having a rack and pinion-type steering mechanism 1, but the invention may also be applied to a vehicle having another type of steering mechanism, such as a ball screw-type steering mechanism.

The rack and pinion-type steering mechanism 1 includes a rack shaft 11 supported to be free to move in an axial length direction within a rack housing 10 that extends in a left-right direction of a vehicle body, not shown in the drawing, and a pinion shaft 2 supported to be free to rotate within a pinion housing 20 that intersects a midway point of the rack housing 10.

The two ends of the rack shaft 11, which project to the exterior from the two sides of the rack housing 10, are connected respectively to left and right front wheels 13, 13 serving as steered wheels via individual tie rods 12, 12, and an upper end of the pinion shaft 2, which projects to the exterior of the pinion housing 20, is connected to a steering wheel 30 serving as a steering member via a steering shaft 3.

A pinion, not shown in the drawing, is formed on a lower portion of the pinion shaft 2 extending through the interior of the pinion housing 20, and in the intersecting portion between the pinion housing 20 and the rack housing 10, this pinion is meshed with a rack provided over an appropriate length of the rack shaft 11. The steering shaft 3 is supported to be free to rotate within a tubular column housing 31 and fixed to the interior of a vehicle cabin, not shown in the drawing, via the column housing 31 in a front side downward inclined attitude. The pinion shaft 2 is connected to one end of the steering shaft 3 downwardly projecting from the column housing 31, and the steering wheel 30 is fixed to the other end of the steering shaft 3 upwardly projecting from the column housing 31.

With this constitution, when the steering wheel 30 is rotated to perform steering, this rotation is transmitted to the pinion shaft 2 via the steering shaft 3, whereupon the rotation of the pinion shaft 2 is converted into an axial length direction movement of the rack shaft 11 in the meshing portion between the pinion and rack. The left and right front wheels 13, 13 are pushed and pulled by this movement via the individual tie rods 12, 12, whereby steering is performed.

A torque sensor 4 for detecting steering torque applied to the steering shaft 3 in accordance with rotation of the steering wheel 30 is provided in a midway position of the column housing 31 supporting the steering shaft 3, and a steering angle sensor 5 for detecting a rotation angle of the steering shaft 3 is provided in series with and below the torque sensor 4. Furthermore, a steering assist motor 6 is mounted below the torque sensor 4 and steering angle sensor 5, and on the outside of the column housing 31.

The torque sensor 4 has a conventional constitution wherein the detection subject steering shaft 3 is divided into an upper shaft and a lower shaft, the two shafts are connected coaxially by a torsion bar having a known torsion characteristic, and relative angular displacement between the two shafts, which is generated due to the action of the steering torque and accompanies torsion of the torsion bar, is detected by appropriate means.

The steering angle sensor 5 is a rotation angle sensor for detecting the rotation angle of the steering shaft 3 on the steering mechanism 1 side of the torque sensor 4. The detection subject steering shaft 3 is a rotary shaft that performs several revolutions to both left and right in accordance with rotation of the steering wheel 30, and therefore the steering angle sensor 5 is preferably a rotation angle sensor constituted to be capable of detecting an absolute rotation angle over the entire rotation range of the steering shaft 3. However, a typical rotation angle sensor that detects the rotation angle within a single revolution may be used, and in this case, the absolute rotation angle of the steering shaft 3 is detected by successively integrating the detection value of the sensor.

Note that a torque sensor constituted to detect the respective rotation angles of the upper and lower shafts and determine relative angular displacement between the two shafts from the difference between the detected angles may be used as the torque sensor 4 for detecting the steering torque, and when this type of torque sensor 4 is used, detecting means for detecting the rotation angle of the lower shaft may double as the steering angle sensor 5.

The steering assist motor 6 is attached to the outside of the column housing 31 such that an axial center thereof is substantially orthogonal to the column housing 31. A worm gear reducer 60 that includes a worm fixed to an output end of the motor 6 extending through the interior of the column housing 31 and a worm wheel that is outwardly fitted and fixed to a midway point of the steering shaft 3 so as to mesh with the worm is formed in the attachment portion. With this constitution, rotation of the steering assist motor 6 is reduced in speed by the worm gear reducer 60 and transmitted to the steering shaft 3, whereby a rotary force is applied to the pinion shaft 2 provided as a continuation of the lower end of the steering shaft 3. In accordance with this rotation, the steering operation performed in the manner described above is assisted.

The steering assist motor 6 attached in the manner described above is driven in accordance with a control command issued to a drive circuit, not shown in the drawing, from an assist control unit 7. The assist control unit 7 receives a steering torque detection value from the torque sensor 4 and also via a frequency analysis unit 8. The assist control unit 7 also receives a steering angle detection value from the steering angle sensor 5 and a vehicle speed detection value from a vehicle speed sensor 9 disposed in an appropriate site of the vehicle.

Figure 2:
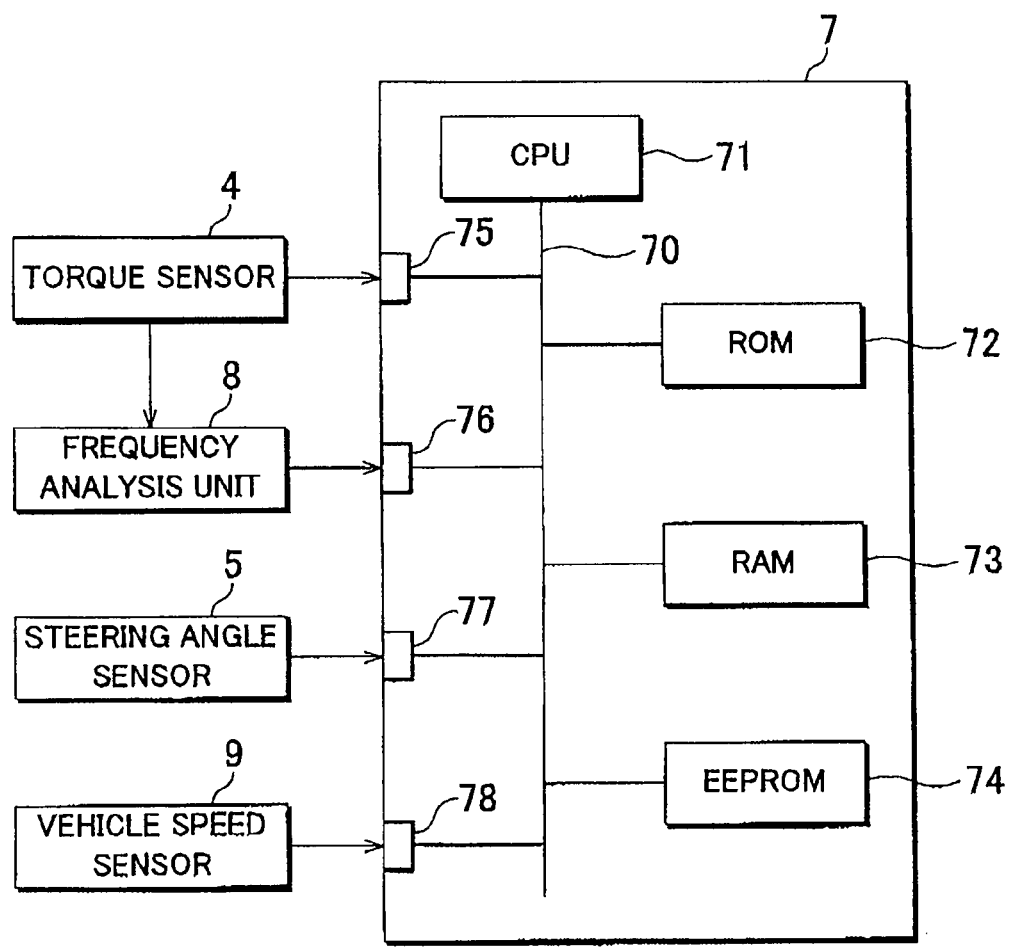
FIG. 2 is a block diagram of an assist control unit.

FIG. 2 is a block diagram of the assist control unit 7. The assist control unit 7 includes a central processing unit (CPU) 71, a read-only memory (ROM) 72, and a random access memory (RAM) 73, which are connected to each other by an internal bus 70, and is constituted to execute assist control and gear rattle noise suppression control, to be described below, through an operation of the central processing unit (CPU) 71 corresponding to a control program stored in the ROM 72. The assist control unit 7 also includes electrically erasable programmable read-only memory (EEPROM) 74 storing externally written control maps for use in these control operations and constant values such as various types of correction values. The steering torque detection value from the torque sensor 4, the output of the frequency analysis unit 8, which is provided as the result of frequency analysis of this detection value, the steering angle detection value from the steering angle sensor 5, and the vehicle speed detection value from the vehicle speed sensor 9 are input into the CPU 71 via individual input interfaces 75 to 78.

The assist control operation of the assist control unit 7 is a conventional control operation in which the steering assist motor 6 is subjected to drive control by obtaining the steering torque detection value that is input directly from the torque sensor 4, applying this steering torque to a control map stored in the EEPROM 74 to determine a target steering assist force value (target assist force) to be generated, and issuing a control command to the motor 6 to generate the target assist force.

A plurality of control maps to be used to determine the target assist force are prepared in advance in accordance with the vehicle speed, and an appropriate control map is selected for use in accordance with the vehicle speed detection result obtained from the vehicle speed sensor 9. Thus, the assist force characteristic can be varied according to the vehicle speed so that during high speed travel, when a road surface reaction force applied to the front wheels 13, 13 is small, for example, the steering assist force generated by the motor 6 is suppressed to a low level, whereby a sense of rigidity is applied to the steering wheel 30, enabling stable steering without wobbling, while during stationary periods and low speed travel, when the road surface reaction force is large, on the other hand, the steering assist force is increased as much as possible so that the steering wheel 30 can be operated lightly, whereby the labor load required to steer the vehicle can be lightened. As a result, an appropriate steering condition can be obtained at all times, regardless of the vehicle speed.

Further, the steering angle detection result obtained from the steering angle sensor 5 is used to correct the target assist force determined from the control map. This correction is performed in such a manner that the target assist force is increased when the steering angle is large, for example. As a result of the correction, the steering assist force is greater during a large turn, in which the road surface reaction force applied to the front wheels 13, 13 is large, than during a small turn, and therefore a favorable steering feeling can be realized.

Figure 3:
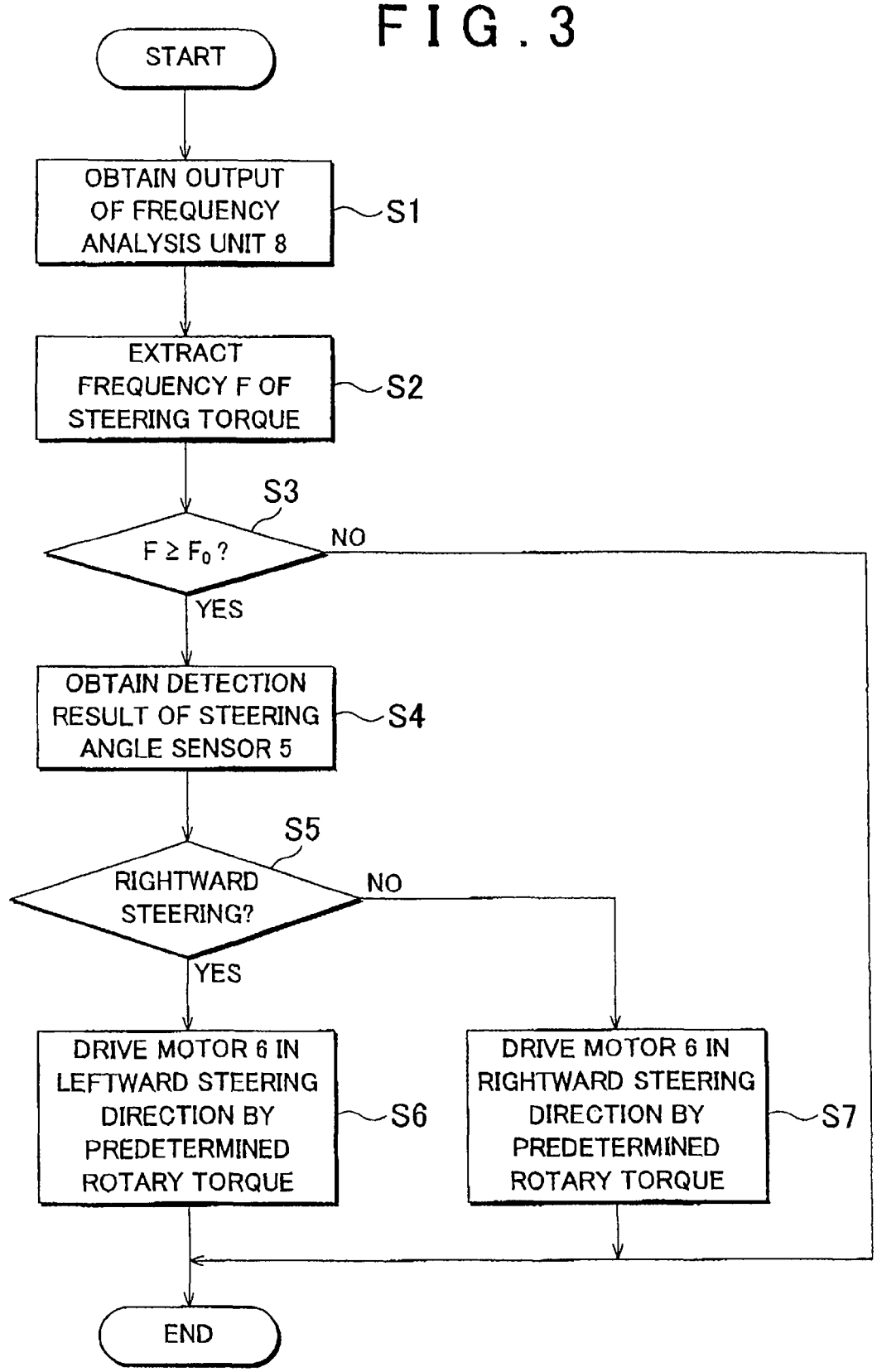
FIG. 3 is a flowchart showing the content of a gear rattle noise suppression operation.

In parallel with the assist control operation described above, the assist control unit 7 performs a control operation to be described below for suppressing gear rattle noise, with the aim of suppressing gear rattle noise generated by the worm gear reducer 60. FIG. 3 is a flowchart showing the content of the gear rattle noise suppression operation.

The operation performed by the assist control unit 7 in accordance with the flowchart shown in FIG. 3 is executed repeatedly at predetermined period intervals during execution of the assist control operation described above. Note that a specialized control unit for performing the control operation to be described below may be provided independently of the assist control unit 7.

In this control operation, the output of the frequency analysis unit 8 is used. The frequency analysis unit 8 is constituted by conventional analyzing means for subjecting input from the torque sensor 4 to frequency analysis, and is constituted to output an intensity distribution at each frequency, which is obtained as the result of the frequency analysis, for example.

First, the assist control unit 7 obtains the output of the frequency analysis unit 8 (step S1) and extracts a frequency F of the steering torque from the output of the frequency analysis unit 8 (step S2). In the step S2, the extracted frequency F is a frequency having an intensity that exceeds a predetermined level in the intensity distribution at each frequency provided as the output of the frequency analysis unit 8.

Next, the assist control unit 7 compares the extracted frequency F to a preset reference frequency F0 (step S3). This comparison is performed to determine whether the torque detected by the torque sensor 4 is torque applied from the side of the steering wheel 30 serving as the steering member (positive input torque) or torque applied from the steering mechanism 1 side (reverse input torque). When the frequency F of the steering torque is equal to or greater than the reference frequency F0 (S3: YES), it is determined that reverse input torque is being applied, and accordingly that an operation is required to suppress gear rattle noise. Hence, the routine advances to a step S4. When the frequency F of the steering torque is smaller than the reference frequency F0 (S3: NO), it is determined that positive input torque is being applied, and the routine is terminated without performing the operations of the step S4 onward for suppressing gear rattle noise.

The determination of the step S3 is based on the knowledge that reverse input torque applied from the steering mechanism 1 side by the action of the road surface reaction force typically has a vibration component with a considerably higher frequency (between 10 Hz and 15 Hz) than positive input torque. The reference frequency F0 used in the determination of the step S3 is set at 10 Hz, for example, such that when the frequency F of the current steering torque, extracted in the step S2, is equal to or greater than the reference frequency F0, it can be determined that reverse input torque is being applied and that a gear rattle noise suppression operation is required. High frequency steering torque may also be detected during the application of positive input, and in this case also the gear rattle noise suppression operation to be described below may be performed.

When the frequency F of the current steering torque is equal to or greater than the reference frequency F0 in the step S3 such that the torque is determined to be reverse input torque, the assist control unit 7 obtains the detection value of the steering angle sensor 5 (step S4) and determines the steering direction from the detection value (step S5). Following this determination, the assist control unit 7 issues an operation command to the steering assist motor 6, drives the motor 6 to generate predetermined rotary torque in a single direction (steps S6, S7), and then terminates one cycle of control operation.

The result of the steering direction determination performed in the step S5 is used to determine the rotation direction of the motor 6, and in the steps S6, S7, an operation is performed to drive the motor 6 to generate rotary torque in an opposite direction to the steering direction determined in the step S5. More specifically, when it is determined that rightward steering is performed (step S5: YES), the routine advances to the step S6, where the motor 6 is driven in a leftward steering direction, and when it is determined that leftward steering is performed (step S5: NO), the routine advances to the step S7, where the motor 6 is driven in a rightward steering direction.

FIG. 4 is a diagram showing the results of an experiment performed to investigate a gear rattle noise generation state. In this experiment, motor torque that varies in short periods is generated in the steering assist motor 6, a state that would occur during the application of reverse input torque is simulated, and gear rattle noise generated in the worm gear reducer 60 at this time is measured. The upper half portion of the diagram shows variation in the motor torque, and the lower half portion of the diagram shows the results of gear rattle noise measurement.

It can be seen from the gear rattle noise measurement results in the lower half portion that, in certain regions, the sound pressure level of the gear rattle noise is clearly lower than the sound pressure level in other regions, as shown by A, B and C in the diagram. When this result is compared with variation in the motor torque, shown in the upper half portion, it can be seen that in the regions A, B and C where the level of the gear rattle noise is low, the motor torque varies within a range biased to one side of "0", whereas in all of the other regions where the level of the gear rattle noise is high, the motor torque varies on either side of "0".

From the results of the above experiment, the inventors of the present application have discovered that driving the motor 6 in a single direction in advance is effective in preventing the generation of gear rattle noise. The reason for this is that when the motor 6 is driven, the respective teeth of the worm serving as the smaller gear and the worm wheel serving as the larger gear in the interior of the worm gear reducer 60 are pressed together in the rotation direction such that relative movement between the teeth, which is the cause of gear rattle noise, does not occur.

When the larger gear vibrates due to the action of reverse input from the steering mechanism 1, the larger gear rotates relative to the smaller gear, to which motor torque is applied from the motor 6, in an identical direction and an opposite direction to the pinion. When the direction of this relative rotation is opposite to the direction of the motor torque, the relative rotation acts to strengthen the pressing described above, and therefore relative movement between the teeth naturally does not occur. Meanwhile, when the direction of the relative rotation is identical to the direction of the motor torque, the smaller gear rotates so as to follow the departing motion of the wheel teeth, and therefore the teeth of the smaller and larger gears can be maintained in the pressed-together state.

When the motor torque varies on either side of "0", the rotation direction of the motor 6 inverts, and therefore the teeth cannot be maintained in the pressed-together state. As a result, a high level of gear rattle noise is generated, as shown in FIG. 4. This phenomenon occurs in an identical fashion when the motor 6 is stopped.

In the electric power steering apparatus according to the invention, when it is determined in the step S3 that reverse input is applied, an operation command is issued to the motor 6 through an operation of the assist control unit 7 in the step S6 or S7, whereby the motor 6 is driven in a single direction by a predetermined rotary torque. As a result, the state of the regions A, B and C in FIG. 4 is realized such that gear rattle noise can be prevented effectively.

The aforementioned predetermined rotary torque is determined on the basis of an envisaged rotary torque (reverse input torque) applied to the steering shaft 3 as a result of reverse input. For example, when the magnitude of the reverse input torque is envisaged to be 5 N·m at most, the predetermined rotary torque is set at a value obtained by dividing 4 (=5−1) N·m by a reduction ratio of the worm gear reducer 60, taking into consideration the fact that resistance torque of approximately 0.1 N·m is applied unconsciously by the driver gripping the steering wheel 30.

When the reduction ratio is 20, the motor 6 is driven to generate 0.2 (=4/20) N·m of rotary torque in accordance with the reverse input determination. As shown in FIG. 4, this rotary torque is sufficient for reducing the sound pressure level of the gear rattle noise but does not impair the assist control operation of the assist control unit 7 performed in response to the detection of positive input torque.

Further, the steering angle detection result is obtained in the step S4, and either the step S6 or S7 is performed in accordance with the steering direction determination of the step S5. In both steps, the motor 6 is driven in the opposite direction to the steering direction, thereby strengthening the pressed-together state of the teeth, and as a result, gear rattle noise can be prevented even more reliably.

In the electric power steering apparatus according to the invention, gear rattle noise can be prevented by the control operation described above, and therefore a high degree of precision is not required in relation to backlash between the worm and the worm wheel during assembly of the worm gear reducer 60 in a midway position of the column housing 31. As a result, a reduction in the number of man-hours required for processing and assembly can be achieved.

Note that in the embodiment described above, the worm gear reducer 60 is used as a gear reducer for reducing the rotation of the steering assist motor 6 and transmitting the reduced rotation to the steering shaft 3, but a gear reducer having another gear such as a spur gear, a bevel gear, or a hypoid gear may also be used. Needless to say, similar effects are obtained in this case.

What is claimed is:

1. An electric power steering apparatus comprising:
   a torque sensor that is disposed in a midway position of a steering shaft connecting a steering member to a steering mechanism, and that detects a steering torque applied to the steering shaft;
   a motor that is driven according to the detected torque in order to assist steering by transmitting a rotary force of the motor to the steering mechanism via a gear reducer;
   an analysis unit that subjects the detected torque to frequency analysis; and
   a control unit that drives the motor to generate a predetermined rotary torque in a single direction to press together the gear teeth of the gear reducer, in response to the frequency analysis including a torque component having a frequency equal to or higher than a predetermined frequency.

2. An electric power steering apparatus comprising:
   a torque sensor that is disposed in a midway position of a steering shaft connecting a steering member to a steering mechanism, and that detects a steering torque applied to the steering shaft;
   a motor that is driven according to the detected torque in order to assist steering by transmitting a rotary force of the motor to the steering mechanism via a gear reducer;
   an analysis unit that subjects the detected torque to frequency analysis;
   a control unit that drives the motor to generate a predetermined rotary torque in a single direction when a torque component having a frequency equal to or higher than a predetermined frequency is included in a result of the frequency analysis; and
   a positive/reverse determination unit that determines, on the basis of the analysis result, whether the detected torque is a positive input torque applied from the steering member or a reverse input torque applied from the steering mechanism,
   wherein the control unit drives the motor to generate the predetermined torque in the single direction when it is determined by the positive/reverse determination unit that reverse input is applied.

3. The electric power steering apparatus according to claim 2, wherein the control unit calculates the predetermined torque to be generated by the motor on the basis of a value obtained by subtracting a fixed torque from a value of the envisaged reverse input torque applied to the steering shaft.

4. An electric power steering apparatus comprising:
   a torque sensor that is disposed in a midway position of a steering shaft connecting a steering member to a steering mechanism, and that detects a steering torque applied to the steering shaft;
   a motor that is driven according to the detected torque in order to assist steering by transmitting a rotary force of the motor to the steering mechanism via a gear reducer;
   an analysis unit that subjects the detected torque to frequency analysis;
   a control unit that drives the motor to generate a predetermined rotary torque in a single direction when a torque component having a frequency equal to or higher than a predetermined frequency is included in a result of the frequency analysis; and
   a steering angle sensor that is disposed in a midway position of the steering shaft further toward the steering mechanism side than the torque sensor, and that detects a rotation angle of the steering shaft,
   wherein the control unit drives the motor to generate the predetermined rotary torque in an opposite direction to a steering direction determined from a detection result of the steering angle sensor.

5. A control method for an electric power steering apparatus having a steering member, a steering mechanism, and a motor for assisting steering, comprising:
   detecting a steering torque applied to a steering shaft that connects the steering member to the steering mechanism;
   implementing frequency analysis on the detected torque; and
   driving the motor to generate a predetermined rotary torque in a single direction to press together the gear teeth of the gear reducer, in response to the frequency analysis including a torque component having a frequency equal to or higher than a predetermined frequency.

6. A control method for an electric power steering apparatus having a steering member, a steering mechanism, and a motor for assisting steering, comprising:
   detecting a steering torque applied to a steering shaft that connects the steering member to the steering mechanism;
   implementing frequency analysis on the detected torque; and
   driving the motor to generate a predetermined rotary torque in a single direction when a torque component having a frequency equal to or higher than a predetermined frequency is included in a result of the frequency analysis; and
   determining that the detected torque is a reverse input torque applied from the steering mechanism when the torque component having a frequency equal to or higher than the predetermined frequency is included in the result of the frequency analysis; and
   causing the motor to generate the predetermined rotary torque.

7. The control method for an electric power steering apparatus according to claim 5, further comprising:
   detecting a steering direction of the steering member; and
   driving the motor to generate the predetermined rotary torque in an opposite direction to the steering direction.

* * * * *